United States Patent
Dietrich, Jr.

(10) Patent No.: US 9,310,239 B2
(45) Date of Patent: Apr. 12, 2016

(54) POWDER METERING APPARATUS AND POWDER METERING METHOD

(75) Inventor: Frederic Dietrich, Jr., Morrens (CH)

(73) Assignee: FYDEC HOLDING AG, Ecublens (CH)

( * ) Notice: Subject to any disclaimer, the term of this patent is extended or adjusted under 35 U.S.C. 154(b) by 6 days.

(21) Appl. No.: 13/992,970

(22) PCT Filed: Oct. 19, 2011

(86) PCT No.: PCT/EP2011/068262
§ 371 (c)(1),
(2), (4) Date: Aug. 16, 2013

(87) PCT Pub. No.: WO2012/079809
PCT Pub. Date: Jun. 21, 2012

(65) Prior Publication Data
US 2013/0320035 A1  Dec. 5, 2013

(30) Foreign Application Priority Data

Dec. 15, 2010  (DE) .......................... 10 2010 054 649

(51) Int. Cl.
*G01F 11/28* (2006.01)
*B65B 1/38* (2006.01)

(52) U.S. Cl.
CPC ................ *G01F 11/282* (2013.01); *B65B 1/38* (2013.01)

(58) Field of Classification Search
CPC .............. B65B 1/30; B65B 1/36; B65B 1/38; G01F 11/282; G01F 11/08; G01F 11/088
USPC ............ 222/1, 205, 306, 308, 309, 368, 633, 222/636, 632, 206; 406/96; 141/5; 417/395
See application file for complete search history.

(56) References Cited

U.S. PATENT DOCUMENTS

| | | | |
|---|---|---|---|
| 3,391,963 A | | 7/1968 | Weeks |
| 4,640,322 A | * | 2/1987 | Ballester .......................... 141/5 |
| 4,640,448 A | | 2/1987 | Trechsel |
| 4,815,634 A | * | 3/1989 | Nowicki ....................... 222/133 |
| 6,010,038 A | | 1/2000 | Dietrich |
| 6,089,256 A | * | 7/2000 | Warby ......................... 137/375 |
| 6,325,572 B1 | | 12/2001 | Dietrich |
| 7,237,699 B2 | | 7/2007 | Zill et al. |
| 7,284,679 B2 | | 10/2007 | Zill et al. |
| 2004/0011357 A1 | | 1/2004 | Braithwaite |

(Continued)

FOREIGN PATENT DOCUMENTS

| | | | |
|---|---|---|---|
| DE | 20320604 U1 | 12/2004 | |
| EP | 0789230 B1 | 6/2006 | |

(Continued)

*Primary Examiner* — Frederick C Nicolas
*Assistant Examiner* — Bob Zadeh
(74) *Attorney, Agent, or Firm* — Bachman & LaPointe, P.C.

(57) ABSTRACT

A powder metering apparatus (1) having a metering chamber (2) which defines a powder metering volume (3) and can be emptied through an outlet opening (11), wherein, in order to draw in powder (9) from a powder supply line (10) through a diaphragm (5) which bounds the metering chamber (2), a negative pressure (8) can be applied to the metering chamber (2). The diaphragm (5) is arranged such that the latter can be adjusted relative to the outlet opening (11) in order to set the powder metering volume (3) and/or to empty the metering chamber (2).

14 Claims, 2 Drawing Sheets

(56) References Cited

U.S. PATENT DOCUMENTS

| | | |
|---|---|---|
| 2005/0023288 A1 | 2/2005 | Zill et al. |
| 2005/0196287 A1 | 9/2005 | Olich |
| 2006/0180609 A1* | 8/2006 | Hager et al. .................. 222/129 |
| 2007/0175916 A1 | 8/2007 | Oldham |

FOREIGN PATENT DOCUMENTS

| | | |
|---|---|---|
| EP | 0937004 B2 | 10/2006 |
| EP | 1790958 A1 | 5/2007 |
| GB | 2184709 A | 7/1987 |
| WO | 0202168 A1 | 1/2002 |

\* cited by examiner

POWDER METERING APPARATUS AND POWDER METERING METHOD

BACKGROUND OF THE INVENTION

The invention relates to a powder metering apparatus comprising a metering chamber which defines a powder metering volume and can be emptied through an outlet opening, wherein, in order to draw in powder from a powder supply line, a negative pressure can be applied to the metering chamber through a diaphragm which bounds the metering chamber.

The invention further relates to a powder metering method for operating a powder metering apparatus constructed according to the concept of the invention, wherein powder is drawn in by means of negative pressure into a metering chamber delimited by a diaphragm and having an outlet opening.

From the applicant's EP 0 937 004 B2 an apparatus and a method are known for the pneumatic conveying of powder, wherein the apparatus has a cylindrical chamber into which powder is able to be drawn in from a powder supply line by means of negative pressure, wherein the metering chamber is supplied with negative pressure through the diaphragm. The fixedly arranged diaphragm has the task here of preventing powder from being drawn into the negative pressure line. The chamber is not completely filled with powder here before the emptying in the drawing-in phase. The known apparatus concerns a transportation apparatus with a predetermined chamber volume, in which the drawn-in powder is emptied exclusively via an application of the chamber by compressed air through a lower outlet opening. In particular if the drawing-in time for the powder was selected to be very long and consequently the powder was intensively compacted in the chamber, difficulties were to be expected on emptying the chamber.

From the applicant's EP 0 789 230 B1 a metering apparatus of complex construction is known for the metering of powders, in which the metering volume is able to be set.

A powder metering apparatus with a flexible diaphragm arranged in a suspended manner is described in U.S. Pat. No. 3,391,963. The diaphragm is arrested at a piston, which together with the diaphragm is axially adjusted during filling of the pump chamber with powder. During emptying of the chamber, an adjustment takes place in the opposite direction, and a resulting stroke makes provision that powder adhering to the diaphragm is shaken off.

Further powder metering apparatuses are described in EP 1 790 958 A1, WO 02/02168 A1, EP 0 937 004 B2 and EP 0 789 230 B1.

Proceeding from the above-mentioned prior art, the invention is based on the problem of indicating a powder metering apparatus constructed as simply as possible for the exact volume metering of pulverulent substances, in which the powder metering volume is able to be set in a simple manner and/or in which emptying problems are reliably prevented.

The object consists in addition in indicating a correspondingly improved method for operating a powder metering apparatus.

SUMMARY OF THE INVENTION

The foregoing object is achieved by the powder metering apparatus and the method of the present invention.

Advantageous further developments of the invention are indicated in the subclaims. All combinations of at least two of the features disclosed in the description and/or the figures fall within the scope of the invention. To avoid repetitions, features disclosed with regard to the apparatus are to be deemed to be disclosed and claimable with regard to the method. Likewise, features disclosed with regard to the method are to be deemed as disclosed and claimable with regard to the apparatus.

The invention is based firstly on the consideration that for an exact metering it is advantageous if the metering chamber is filled completely with powder from a powder supply line through a sufficiently long drawing-in time. However, the problem results from this of a comparatively high degree of compacting of the powder in the metering chamber with corresponding emptying problems resulting, in turn, from this. In addition, it was recognized that for certain metering applications it is advantageous if not always only one particular, predetermined (unchangeable) quantity of powder is able to be metered with a metering apparatus, but rather if the powder volume which is to be metered is able to be adjusted.

To solve at least one of the above-mentioned problems, preferably both problems, the invention proposes to arrange the diaphragm which bounds the metering chamber preferably on a side facing away from the outlet opening and which is primarily intended to prevent powder from being drawn into the negative pressure supply line and consequently is embodied so as to be permeable to air but impermeable to powder, such that in contrast to the prior art said diaphragm is not arranged fixedly, but rather together with the diaphragm holder so as to be adjustable in a relative manner to the outlet opening of the metering chamber, in order according to a first aspect by means of the diaphragm by adjusting the diaphragm (together with the diaphragm holder) to press out the drawn-in powder volume in the direction of the outlet opening through the outlet opening, and/or according to a second aspect to be able to alter or respectively set as exactly as possible the powder metering volume and hence the metering chamber volume, in which the position which the diaphragm assumes during the drawing-in process relative to the outlet opening is able to be altered. Basically, it is possible in a powder metering apparatus to realize only one of the above-mentioned two aspects, wherein it is preferred if both aspects are realized.

The diaphragm holder is a separate component from the metering chamber and preferably the diaphragm is secured exclusively to the diaphragm holder (and not to the metering chamber wall). Preferably, the diaphragm is secured by its outer peripheral rim to the diaphragm holder. During adjusting of the diaphragm holder, the entire diaphragm is adjusted together therewith.

The degree or respectively the extent of the vacuum (negative pressure) with which the metering chamber is acted upon can preferably be adapted to different powders—it should preferably be sufficient in order to be able to fill the metering chamber completely with powder by the drawing in of powder.

In particular for the case where the metering chamber is not constructed so that it can be emptied by means of the diaphragm by the pressing out of the powder, the drawn-in powder can be preferably, for example exclusively, emptied from the metering chamber by compressed air. If required, compressed air can also be used as an assistance, when the diaphragm is provided or respectively is adjustably arranged for the emptying of the chamber. Also, a compressed air connection can be provided in order to free the diaphragm of adherent powder. The extent of the pressure can preferably be adjusted.

It is particularly expedient if the powder supply line, in order to enable a complete filling of the metering chamber during the powder drawing-in phase, opens into the metering chamber as close as possible to a chamber base or respectively a chamber end facing away from the diaphragm, which can be realized for example in that the powder supply line opens into the metering chamber directly above the metering chamber outlet opening or alternatively in that during the drawing-in phase, as will be further explained later, powder is drawn in through the outlet opening.

The most varied of possibilities exist with regard to the construction of the diaphragm. The main task of the diaphragm is to delimit the metering chamber volume and, at the same time, to prevent a drawing in of powder through the preferably rigid diaphragm in the direction of the negative pressure supply, whereby the diaphragm must be provided in a manner known per se such that it is indeed permeable for air, at least with corresponding pressure difference application, but is at least largely, preferably completely, impermeable for powder. It has proved to be particularly expedient if the diaphragm has a support layer, for example a felt layer or a wire framework, on which the actual filter layer is arranged on the side facing the inner side of the metering chamber.

Different possibilities exist with regard to the concrete realization of the drawing-in position of the diaphragm, i.e. the relative position of the diaphragm which is assumed by the diaphragm relative to the outlet opening during the drawing in of powder. Basically, provision is made and preferred in further development of the invention that the setting is realized continuously, for example by means of a spindle drive, wherein according to an alternative variant embodiment the setting is realized in discrete steps (defined stages), for example by the provision of detents.

A particularly simple as well as effective and less interference-prone possibility for altering the drawing-in position previously explained exists when a spindle drive is associated with the diaphragm, which spindle drive is preferably actuatable by hand, wherein the diaphragm, by actuation of the spindle drive, can be adjusted relative to the outlet opening. For this, as will be further explained later, the diaphragm is preferably adjustable relative to the preferably cylindrical metering chamber peripheral wall. Cylindrical is preferably understood to mean circular-cylindrical, wherein also cylinders with a base area deviating from the circular shape are able to be realized, for example with an oval or star-shaped base area.

In particular when the diaphragm is adjustable by means of an actuator for emptying the metering chamber, the drawing-in position of the diaphragm is defined or respectively predetermined by a stop position delimiting the adjustment movement of the diaphragm in a direction away from the outlet opening, against which stop position the diaphragm and/or a diaphragm holder and/or a moved actuator part, after the emptying process, strikes or respectively is adjusted back by means of the actuator, preferably by means of a linear drive. The above-mentioned, in particular upper, stop position for the diaphragm and/or a diaphragm holder and/or a moved actuator part, for example a piston, can be altered or respectively set for example by adjusting a stop element defining the stop position, for example by hand via a spindle drive. Instead of a manual drive for adjusting the above-mentioned stop position, in particular by adjusting a stop element, an automatic drive is also able to be realized for this, for example a rotary or linear drive.

It is most particularly preferred if for adjusting the diaphragm relative to the outlet opening an actuator, in particular a linear drive, preferably a pneumatic or hydraulic piston-cylinder drive is provided, wherein of course also alternatively a rotatory drive can be provided, the rotational movement of which is converted into a translatory movement of the diaphragm. Preferably the actuator serves to adjust the diaphragm in the direction of the outlet opening, in order to thereby, after the drawing-in process, press out the drawn-in powder volume through the outlet opening. Additionally or alternatively, the actuator can be provided to set the drawing-in position, i.e. the relative position which the diaphragm assumes relative to the outlet opening during the drawing in of the powder, wherein it is particularly preferred for this, but is not imperative, if in this case with this drawing-in position of the diaphragm, the concern is not with a position predetermined by a stop position for the diaphragm and/or for the diaphragm holder, which is realized via an adjustable stop element, but instead the relative position defining the fillable metering chamber volume is held by the linear drive. In the case of the provision of a pneumatic drive as linear drive, it is preferred if for this a pneumatic drive able to be acted upon with compressed air on two sides facing away from each other is provided for the setting and preferably regulated stop-free holding of this drawing-in position. In order to minimize the effort of regulating, of course and alternatively the drawing-in position can be altered by adjusting an optional stop element.

In order to enable an optimum emptying of the metering chamber by means of the diaphragm, it is particularly preferred if the actuator, during emptying, covers at least one adjustment path which corresponds to at least a quarter, preferably at least half, still further preferably at least three quarters of the distance or preferably the entire distance which the outlet opening assumes from the diaphragm in its drawing-in position. As already previously indicated, the actuator for adjusting the diaphragm can be used to set the drawing-in position of the diaphragm and preferably also to keep it active by realizing a control loop. In particular for the case where the drawing-in position is not defined via a stop (stop element) for the diaphragm, delimiting the adjustment movement of the diaphragm or respectively of the actuator, it is preferred to associate control means with the actuator, which activate the actuator such that the latter adjusts the diaphragm to a predetermined relative position relative to the outlet opening which is deposited for example in a non-volatile memory and/or is able to be deposited therein, and holds this position, preferably in a regulated manner for example by suitable application of pressure and/or counter-pressure of a piston of a pneumatic linear drive.

As already indicated in the introduction, it is expedient if the metering chamber is able to be acted upon by compressed air through the diaphragm, in order to free the diaphragm of adherent powder during or after the emptying process or during a cleaning cycle, and/or in order to assist an emptying of the metering chamber by means of the diaphragm and/or in order to empty the metering chamber exclusively (i.e. without diaphragm adjustment) by the use of compressed air.

It has proved to be particularly expedient if there is associated with the diaphragm a preferably piston-like diaphragm holder, on which the diaphragm is fixed. The diaphragm is preferably adjusted here by adjusting the diaphragm holder relative to the outlet opening. The diaphragm holder can be constructed in a single piece, but is preferably constructed in several pieces, in particular such that the diaphragm is clamped between two diaphragm holder parts, in particular able to be screwed with one another in axial direction. According to a first alternative, the diaphragm holder can be directly part of the actuator, in particular of a piston/cylinder drive for adjusting the diaphragm, or according to a second alternative it can be operatively connected with such an actuator by a mechanical coupling. The diaphragm holder parts can, for example, be screwed with one another, glued with one another, or pressed, or welded, or secured to one another in another manner.

In order to prevent powder from being drawn in into a region radially between the diaphragm holder and a peripheral wall of the metering chamber and/or into a region situated on a side of the diaphragm holder facing away from the metering chamber, it is preferred if the diaphragm holder during relative adjustment of the diaphragm is sealed with respect to the peripheral wall of the metering chamber, which is preferably contoured in a circular-cylindrical manner. Basically for this at least one ring seal (elastomer seal) can be provided between the peripheral wall and the diaphragm holder. However, it is particularly preferred if the sealing effect, preferably solely, is achieved by the choice of the material combination of the material of the diaphragm holder and of the peripheral wall, so that separate elastomer seals can be dispensed with.

This can be realized preferably in that the peripheral wall of the metering chamber is constructed from a more elastic material than the diaphragm holder. Preferably, the metering chamber peripheral wall is constructed for this from plastic, in particular PTFE, and the diaphragm holder is constructed for example from metal. The reverse configuration (metallic peripheral wall/plastic diaphragm holder) is, alternatively, able to be realized.

It is preferred still further, in particular in a variant embodiment without an elastomer ring seal, if the diaphragm holder rests on the peripheral wall via a, preferably metallic, ring section, preferably via at least two ring sections disposed at a distance in an adjustment direction of the diaphragm (in particular a longitudinal axis direction of a cylindrical metering chamber), or respectively slides (in a sealing manner) along the peripheral wall by means of this at least one ring section.

A further variant embodiment of the powder metering apparatus is particularly preferred in which the, preferably elongated, piston-like diaphragm holder has at least one, preferably central, particularly preferably exclusively one, duct through which the metering chamber (through the diaphragm) is able to be supplied with negative pressure for the drawing in of powder, or with excess pressure (compressed air). Here, a negative pressure supply line and/or a compressed air supply line are connected to the duct and hence to the diaphragm holder, which supply duct(s) is/are adjusted jointly with the diaphragm holder during an adjustment movement of the diaphragm holder relative to the outlet opening.

Preferably, closure means are associated with the outlet opening of the metering chamber which ensure that, during the drawing-in phase, powder can arrive out from the metering chamber into a powder receiving vessel. For the case where during the drawing-in phase the powder supply is to take place through the outlet opening, the closure means can be constructed such that they separate a connection between the powder supply line and the metering chamber during the emptying phase.

In addition, the invention details a powder metering method, in particular for operating a previously described powder metering apparatus, constructed according to the concept of the invention, wherein it is the core of the method to draw in powder by the application of negative pressure to a metering chamber. It is essential to the invention here that the diaphragm is adjusted relative to the outlet opening for setting the metering volume and/or for pressing out a drawn-in powder volume out from the metering chamber.

BRIEF DESCRIPTION OF THE DRAWINGS

Further advantages, features and details of the invention will emerge from the following description of preferred example embodiments and with the aid of the drawings.

These show in.

In the figures, identical elements and elements with identical function are marked by identical reference numbers.

DETAILED DESCRIPTION

Figure 1:
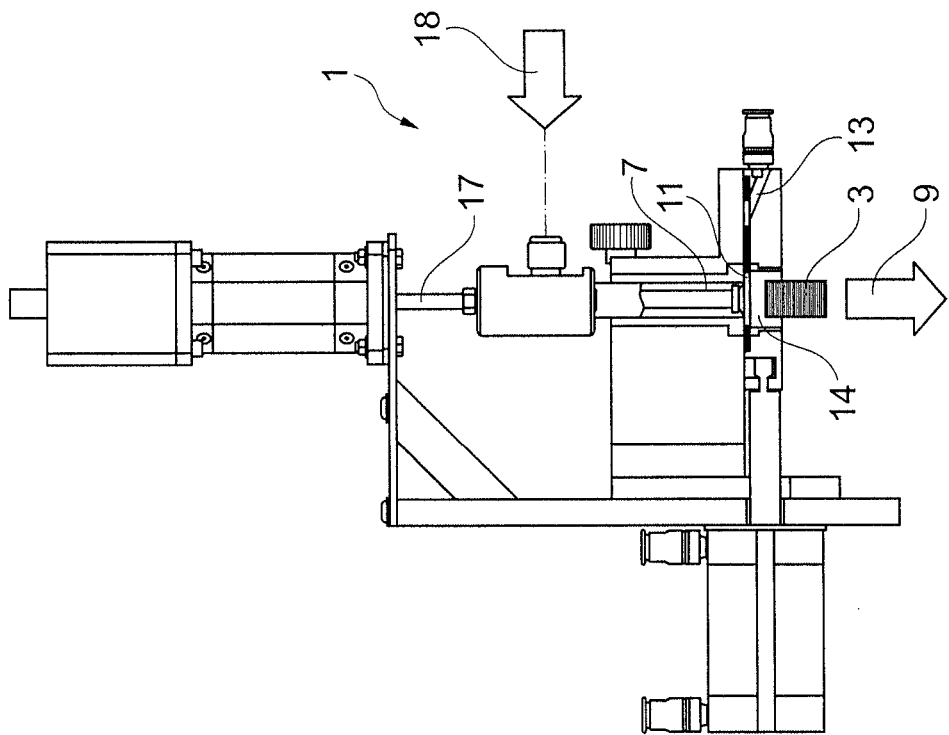
FIG. 1: diagrammatic representation of a powder metering apparatus during the drawing-in phase.
Figure 2:
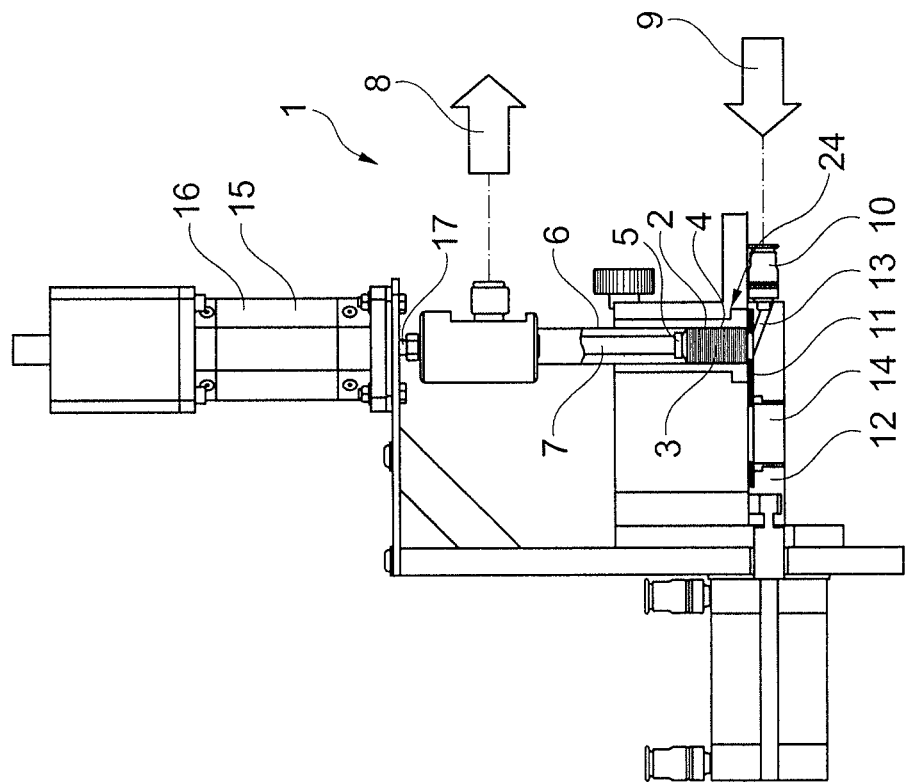
FIG. 2: the powder metering apparatus according to FIG. 1 during an emptying phase.

In FIGS. 1 and 2 a powder metering apparatus 1 is shown, for example for the metering of pulverulent medicaments, in order in order to press a tablet from the metered powder quantity in a downstream method step.

The powder metering apparatus comprises a metering chamber 2, contoured in a circular cylindrical manner, the volume of which corresponds to a powder metering volume 3 (which is to be metered). The metering chamber 2 is delimited on the peripheral side by a peripheral wall 4, contoured in a circular-cylindrical manner on the inner periphery and constructed from plastic, here PTFE. In the plane of the drawing at the top the metering chamber 2 is delimited by a diaphragm 5 which is impermeable for the powder which is to be metered but permeable to air, and by a diaphragm holder 6, here hollow cylindrical, in several parts, and holding the diaphragm 5.

In the hollow cylindrical diaphragm holder 6 an elongated duct 7 is formed, through which the metering chamber 2 is able to be acted upon by negative pressure 8 through the diaphragm 5, in order in this way, during a drawing-in phase, to draw in powder 9 out from a powder supply line 10 into the metering chamber. In the example embodiment which is shown, the powder supply line 10 is arranged such that it is connected with the metering chamber 2 via an outlet opening 11 provided on the side of the metering chamber 2 facing away from the diaphragm 5, such that during the action upon the metering chamber 2 with negative pressure, powder is drawn in from the powder supply line 10 through the outlet opening 11. In an alternative solution, not explicitly illustrated but merely indicated, the powder supply line 10, which is indicated via the arrow 24, is guided in a region between the diaphragm 5 and the outlet opening 11 into the metering chamber 2, preferably directly adjacent to the outlet opening 11 or respectively to the base of the metering chamber 2.

Associated with the outlet opening 11 are closure means 12 in the form of a slider, which is adjustable between at least two, here exclusively two adjustment positions perpendicularly to an adjustment direction, to be further explained later, of the diaphragm 5 and namely from the closure position illustrated in FIG. 1, in which the metering chamber 2 is in fact connected with the powder supply line 10, but is not able to be emptied, and an emptying position, illustrated in FIG. 2, in which a connecting duct 13, provided in the slider or respectively in the closure means 12, between the powder supply line 10 and the outlet opening 11 is out of congruence with the outlet opening 11 and instead a through-opening 14 of the closure means 12 is aligned with the outlet opening 11, such that the powder 9 or respectively the drawn-in powder metering volume 3 can be emptied, preferably pressed out mechanically, through the through-opening 14 in a container which is not illustrated.

For the case where the powder supply line 10 does not open into the closure means 12, the connecting duct 13 can be dispensed with, wherein then the outlet opening 11 is completely closed in the drawing position.

According to an alternative variant, which is not illustrated, instead of a slider, a rotatable element, preferably a rotatable disc (not illustrated) is used as closure means, which in at least one position preferably has a through-opening for emptying the metering chamber, and in another rotation position preferably closes the outlet opening 11, at least such that it can not be emptied into a container.

As can be seen from FIG. 1, the piston-shaped diaphragm holder 6 is coupled mechanically with an actuator 15, here a pneumatic piston cylinder unit, comprising a cylinder 16 and an extendable piston 17, by means of which the diaphragm holder 6 together with the diaphragm 5 is adjustable in an axial direction relative to the outlet opening 11 within the cylindrical peripheral wall 4 of the metering chamber 2, and namely from a drawing-in position illustrated in FIG. 1, which is maintained by the diaphragm 5 during the drawing in of powder, and an adjusted position in the direction of the outlet opening 11, illustrated in FIG. 2. This can be seen inter alia on the extended piston 17. In the example embodiment which is shown, the combination of diaphragm 5 and diaphragm holder 6 is movable up to the outlet opening 11, in order to hereby press out the powder volume 3 mechanically through the outlet opening and the through-opening 14 of the closure means 11, which is situated in the emptying position. This mechanical emptying process by means of the diaphragm 5 can be assisted by compressed air 18, which can flow via the duct 7 to the diaphragm 5 and through the latter into the metering chamber.

After the completed emptying process, illustrated in FIG. 2, the diaphragm 5 is adjusted back again into the drawing-in position illustrated in FIG. 1.

In the powder metering apparatus 1 according to FIGS. 1 and 2, the drawing-in position, i.e. the relative position which the diaphragm 5 assumes together with the diaphragm holder 6 relative to the outlet opening 11 during the drawing in of powder, and hence the powder metering volume 3 (or respectively the position into which the diaphragm is moved back after the emptying process), is able to be set. For this, the actuator 15 is connected with suitable control means, which adjust the drawing-in position by corresponding pressure application of the piston. Here, the desired drawing-in position is preferably deposited in a non-volatile memory of the control means and still further preferably is presettable, so that different powder metering volumes can be metered from the same apparatus.

According to an alternative variant, which is not illustrated, the drawing-in position of the diaphragm 5 is not realized via a suitable regulating of the actuator 15, but rather by manual or activated adjustment of an upper stop (stop element) for the piston 17 of the actuator 15 or for the diaphragm holder 6.

Figure 3:
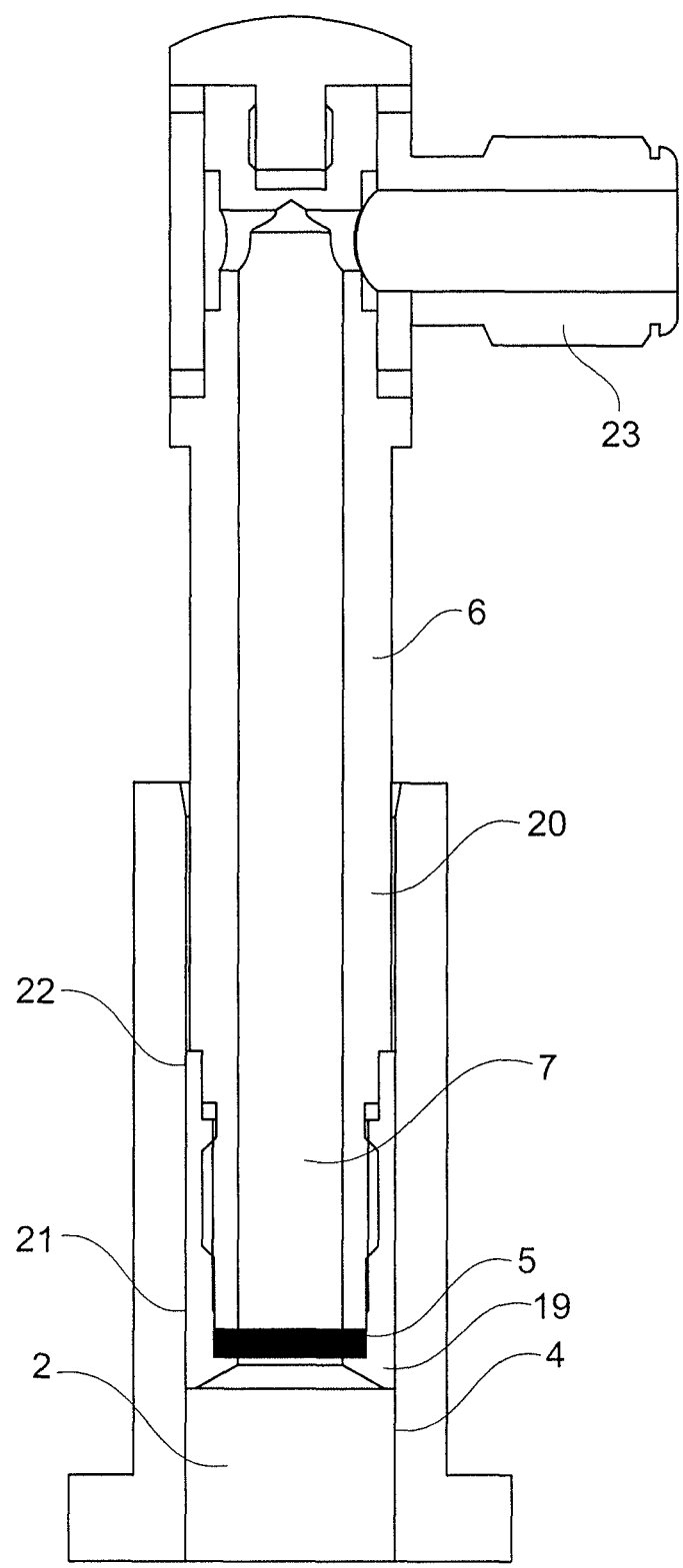
FIG. 3: a representation of the component combination diaphragm holder/diaphragm and metering chamber-peripheral wall.

In FIG. 3 the diaphragm holder 6 is shown in detail together with the diaphragm 5. The diaphragm 5 is clamped axially between a lower or respectively outer diaphragm holder part 19 and an upper diaphragm holder part 20, able to be screwed into an internal thread of the lower diaphragm holder part 19, in which upper diaphragm holder part the duct 7 for compressed air and/or negative pressure is constructed for corresponding supply of the metering chamber 2.

It can be seen that the diaphragm holder 6, more precisely the lower diaphragm holder part 19 (alternatively or additionally the upper diaphragm holder part 20) rests in a sealing manner directly, i.e. without intermediate arrangement of an elastomer ring seal, on the cylindrical peripheral wall 4 of the metering chamber 2, constructed here from PTFE, and on the adjustment movement of the diaphragm 5 slides along the latter in axial direction. In the example embodiment which is shown, the diaphragm holder 6 is constructed from metal, for example aluminium or high-grade steel, and rests in a lower ring region 21 and in an upper ring region 22 spaced apart axially therefrom, in radial direction in a sealing manner against the peripheral wall 4.

It can be seen that here, angled to the duct 7, a connection 23 is provided on the diaphragm holder 6, to which a negative pressure supply and/or excess pressure supply is able to be connected.

The invention claimed is:

1. A powder metering apparatus, comprising a peripheral wall defining in part a metering chamber (2) having a powder metering volume (3) and an outlet opening (11), a powder supply line (10), a diaphragm (5) reciprocally movable in the metering chamber relative to the peripheral wall between a first position for applying a negative pressure (8) to the metering chamber (2) and a second position to empty the metering chamber, wherein the diaphragm (5) bounds the metering chamber (2) and the diaphragm (5), together with a diaphragm holder (6) on which the diaphragm (5) is fixed, is adapted to be adjusted relative to the outlet opening (11) in order to set the powder metering volume (3), the peripheral wall (4) of the metering chamber (2) is constructed from a material which is more elastic than the diaphragm holder (6) material, so that the diaphragm holder (6) is sealed on the peripheral wall (4) of the metering chamber (2) as the diaphragm holder is moved along the peripheral wall, thereby eliminating any separate elastomer seals for sealing the diaphragm holder (6) with respect to the peripheral wall (4).

2. The powder metering apparatus according to claim 1, wherein the diaphragm (5) is adapted to assume the first position with respect to the outlet opening by adjustment means (11) during drawing in of powder (9).

3. The powder metering apparatus according to claim 2, wherein the first position is set automatically or manually by the adjustment means comprising a spindle drive actuatable by hand to adjust a stop element defining a stop position for the diaphragm (5) and/or the diaphragm holder (6) and/or a moved actuator part.

4. The powder metering apparatus according to claim 2, wherein the adjustment means comprises a linear drive actuator (15) associated with the diaphragm (5) for adjusting position of the diaphragm relative to the outlet opening (11).

5. The powder metering apparatus according to claim 4, wherein the diaphragm (5) is adjustable for emptying a powder volume out from the metering chamber (2) in a direction of the outlet opening (11) over an adjustment path which corresponds to at least a quarter of the distance between the outlet opening (11) and the first position of the diaphragm (5) during the drawing in of the powder.

6. The powder metering apparatus according to claim 4, wherein control means are associated with the actuator (15) for activating the actuator (15) to adjust the diaphragm (5) to a predetermined first position to draw in the powder (9) to the metering chamber.

7. The powder metering apparatus according to claim 6, wherein the control means activate the actuator (15) such that the actuator (15) holds the diaphragm in the first position in a regulated manner by means of a control loop.

8. The powder metering apparatus according to claim 1, wherein the metering chamber (2) is acted upon by compressed air (18) through the diaphragm (5) for emptying a powder volume out from the metering chamber (2).

9. The powder metering apparatus according to claim 1, wherein the diaphragm holder (6) to which the diaphragm (5) is fixed is part of a piston.

10. The powder metering apparatus according to claim 1, wherein the diaphragm holder (6) is constructed from metal and the peripheral wall (4) of the metering chamber (2) is constructed from PTFE.

11. The powder metering apparatus according to claim 1, wherein the diaphragm holder (6) rests directly on the peripheral wall (4) of the metering chamber (2) via at least two metallic ring regions (21, 22) disposed at a distance in an adjustment direction.

12. The powder metering apparatus according to claim 1, wherein the diaphragm holder (6) has at least one duct (7) through which the metering chamber (2) is able to be supplied with negative pressure (8) for drawing in of powder (9).

13. The powder metering apparatus according to claim 1, wherein the diaphragm (5) is received in a clamping manner axially between two diaphragm holder parts (19, 20) of the diaphragm holder (6).

14. The powder metering apparatus according to claim 1, wherein closure means (12) are associated with the outlet opening (11), by which the closure means of the outlet opening (11) is able to be freed for the emptying of the metering chamber (2).

\* \* \* \* \*